United States Patent Office 3,535,362
Patented Oct. 20, 1970

3,535,362
PROCESS FOR PREPARING AROMATIC ISOTHIOCYANATES
Gerhard F. Ottmann and Ehrenfried H. Kober, Hamden, Conn., assignors to Olin Corporation, a corporation of Virginia
No Drawing. Continuation-in-part of application Ser. No. 629,421, Apr. 10, 1967. This application Oct. 2, 1967, Ser. No. 672,014
Int. Cl. C07c 161/04
U.S. Cl. 260—454         16 Claims

ABSTRACT OF THE DISCLOSURE

A process for providing aromatic isothiocyanates which comprises reacting an aromatic nitro compound, an aromatic nitroso compound, or an aromatic azoxy compound with carbon disulfide or carbonyl sulfide in the presence of selected bases.

---

This application is a continuation-in-part of our co-pending application S.N. 629,421, filed on Apr. 10, 1967 now abandoned.

This invention relates to an improved process for the preparation of aromatic isothiocyanates.

Esters of isothiocyanic acid have been previously prepared. They are useful agricultural chemicals since they have exhibited valuable utility as fungicides and herbicides. Many of these esters are useful nematocides and insecticides particularly as moth-proofing agents. Isothiocyanates have also been extensively employed as intermediates in the preparation of pesticidal and pharmaceutical compounds. For instance, they have been reacted with stoichiometric amounts of chlorine to provide N-aryl- and N-alkyl-S-chloroisothiocarbamoyl chlorides, as, for example, disclosed in Journal of Organic Chemistry, 31, 838 (1966); and these derivatives are useful as herbicides and nematocides. Isothiocyanates also react with a molar excess of chlorine to provide the corresponding isocyanide dichlorides which are known to be useful pesticides.

A variety of synthetic methods have been previously utilized to obtain the aforementioned esters. For example, they may be generally prepared by the reaction of primary amines with thiophosgene, but this is not a practical procedure since thiophosgene is not readily available. Some of the isothiocyanates have been prepared by the reaction of isocyanate esters with phosphorus pentasulfide, but this is not a general reaction and cannot be utilized in the preparation of all isothiocyanates. The esters have also been prepared by an involved synthetic route comprising reacting primary amines with carbon disulfide in the presence of selected bases to provide salts of dithiocarbamic acids which can then be further reacted to the desired isothiocyanates, but this is a complicated and costly procedure.

It has now been found that carbocyclic aromatic isothiocyanates are provided in good yield and high purity by reacting an aromatic nitro compound, an aromatic nitroso compound, or an aromatic azoxy compound or mixtures thereof with carbon disulfide or carbonyl sulfide in an anhydrous system at an elevated temperature when selected bases are employed in the reaction. The process of this invention is a convenient, direct one-step procedure for providing aromatic isothiocyanates from cheap, readily available reactants; and this process obviates the requirement of utilizing the previously disclosed tedious multistep procedures. The process is simply and conveniently performed by heating the reacting materials in a closed reaction system at a temperature range of about 125°–250° C. under autogenous pressure.

A wide variety of aromatic nitro compounds may be utilized as reactants in the process of this invention. As used herein, the term "carbocyclic aromatic nitro compounds" represents those organic compounds having at least one nitro group attached directly to an aromatic hydrocarbon nucleus such as benzene, naphthalene, anthracene, phenanthrene and the like. The aromatic hydrocarbon nucleus may also contain other ring substituents in addition to the nitro groups. Thus the term "carbocyclic aromatic nitro compound" as used herein also represents aromatic hydrocarbons having alkyl, aryl, aralkyl, alkoxy, aryloxy, alkylmercapto, arylmercapto, halogen, cyano, isocyanato, or isothiocyanato substituents on the aromatic hydrocarbon moiety in addition to the one or more nitro groups. In general, these additional ring substituents do not inhibit completely the reaction of carbon disulfide or carbonyl sulfide with the nitro groups under the conditions of the process disclosed herein. Carbon disulfide or carbonyl sulfide may also react with some of the additional ring substituents concurrently with the reaction of the nitro groups, and some of the substituents may impede or retard the desired reaction of $CS_2$ or COS with the nitro groups as for instance by introducing a steric hindrance factor; but invariably some formation of aromatic isothiocyanate occurs by the process albeit at a reduced rate or in lower yield.

Thus among the aromatic nitro compounds which may be used as reactants in the practice of this invention are the various nitrobenzenes, nitronaphthalenes and nitroanthracenes. Also included as useful reactants are the various nitrobiphenyls, nitrotoluenes, nitroxylenes, nitromesitylenes, nitrodiphenyl alkanes, alkoxynitrobenzenes, nitrodiphenyl ethers, nitropolyphenyl ethers, alkylmercapto nitrobenzenes, nitrodiphenyl thioethers, benzonitriles, and aromatic nitrohalocarbons.

Illustrative of specific aromatic nitro compounds useful as reactants are: nitrobenzene, o-dinitrobenzene, m-dinitrobenzene, p-dinitrobenzene, 1,3,5-trinitrobenzene, 1-nitronaphthalene, 2-nitronaphthalene, o-nitrotoluene, m-nitrotoluene, p-nitrotoluene, 2,4-dinitrotoluene, 2,6-dinitrotoluene, o-nitro-p-xylene, 2-methyl-1-nitronaphthalene, dinitromesitylene, o-nitrobiphenyl, m-nitrobiphenyl, p-nitrobiphenyl, 4,4'-dinitrobiphenyl, 2,4-dinitrobiphenyl, bis(p-nitrophenyl) methane, o-nitroanisole, m-nitroanisole, p-nitroanisole, 2,4-dinitroanisole, o-nitrophenetole, p-nitrophenetole, and 2,4-dinitrophenetole.

Similarly: o-nitrophenyl phenyl ether, m-nitrophenyl phenyl ether, p-nitrophenyl phenyl ether, bis(2,4-dinitrophenyl) ether, bis(p-nitrophenyl) ether, o-nitrophenyl phenyl thioether, m-nitrophenyl phenyl thioether, p-nitrophenyl phenyl thioether, bis(p-nitrophenyl) thioether, o-nitrophenyl methyl thioether, bis(p-nitrophenoxy) ethane, 1-chloro-2-nitrobenzene, 1-bromo-2-nitrobenzene, 1-chloro-3-nitrobenzene, 1-bromo-3-nitrobenzene, 1-chloro-4-nitrobenzene, 1-bromo-4-nitrobenzene, 1-fluoro-4-nitrobenzene, 2-chloro-6-nitrotoluene, 2-bromo-6-nitrotoluene, 2-fluoro-6--nitrotoluene, 4-chloro-3-nitrotoluene, 1-chloro-2,4-dinitrobenzene, -1-bromo-2,4-dinitrobenzene, 1-fluoro-2,4-dinitrobenzene, 1,4-dichloro-2-nitrobenzene, 1,4-difluoro-2-nitrobenzene, 1,3,-5-trichloro-2-nitrobenzene, 1,3,5-tribromo-2-nitrobenzene, 1,2-dichloro-4-nitrobenzene, 1,2,4-trichloro-5-nitrobenzene, o-nitrophenyl isocyanate, m-nitrophenyl isocyanate, p-nitrophenyl isocyanate, 1-chloro-2,4-dimethoxy-5-nitrobenzene, 1,4-dimethoxy-2-nitrobenzene, o-nitrobenzonitrile, m-nitrobenzonitrile, p-nitrobenzonitrile, 3,3'-dimethoxy-4,4'-dinitrobiphenyl, and 3,3'-dimethyl-4,4'-dinitrobiphenyl may be employed as starting reactants.

Isomers and mixtures of the aforesaid aromatic nitro compounds and substituted aromatic nitro compounds may also be utilized in the practice of this invention as well as homologues and other related compounds. Generally, the starting nitro compound reactants contain between 6 and about 20 and preferably below about 14 carbon atoms. Compounds which have both nitro and isothiocyanato substituents may also be employed as reactants. When aromatic polynitro compounds are utilized as reactants in this process, considerable amounts of compounds having both nitro and isothiocyanato groups are usually provided. Thus, for instance, when bis(p-nitrophenyl) sulfide is employed as a reactant, 4-nitrophenyl-4'-isothiocyanatophenyl sulfide is provided. Since the process of this invention is conveniently adaptable to batchwise, semi-continuous, or continuous operations, the nitro-isothiocyanato derivative may be utilized as a starting reactant in a new batch operation or may simply be directly converted to the bis-isothiocyanato derivative by recycling in a continuous practice of this process.

While the process is generally applicable to the conversion of any of the aforementioned aromatic nitro compounds to aromatic isothiocyanates, included among the preferred reactants to be utilized in this invention are the nitrobenzenes, both mono- and polynitro, including isomeric mixtures thereof; the alkylnitrobenzenes, including the various nitrated toluenes and the nitrated xylenes; the alkoxynitrobenzenes; the nitrated mono-, di-, and trichlorobenzenes and toluenes; nitrated biphenyl and nitrated diphenylmethane. Other preferred reactants which can be particularly mentioned include the nitrodiphenyl ethers, the bis(nitrophenoxy)alkanes, and the bis(nitrophenyl)sulfides.

Aromatic nitroso compounds and aromatic azoxy compounds are also converted to aromatic isothiocyanates in accordance with this invention. As described in the preceding discussion relating to suitable aromatic nitro compound reactants, the aromatic nitroso and azoxy compounds may also contain one or more other substituents on the aromatic ring in addition to the reactive nitroso or azoxy groups.

In the reaction with aromatic mononitro, mononitroso or monoazoxy reactants, it has been found that preferred practice involves utilizing at least one mole of carbon disulfide or carbonyl sulfide per mole of nitrogenous reactant. When a bifunctional reactant (e.g., a dinitro compound) is used, the amount of $CS_2$ or COS is preferably doubled. Optimum yields of aromatic isothiocyanates are in fact obtained when excess molar amounts of carbon disulfide or carbonyl sulfide are employed, that is more than an equimolar quantity in reaction with a mononitro compound for instance. The use of molar excesses is also advantageous in that the $CS_2$ and COS function as solvents in the reaction system.

Suitable bases which may be employed in this process are selected metal mercaptides, alkoxides and aryloxides having the formula

$$Me(XR)_n \qquad (I)$$

wherein Me represents either an alkali metal or a metal selected from Groups II and IIIb of the periodic table; X represents either oxygen or sulfur; n is an integer from 1–3; and R represents alkyl, substituted alkyl, aryl, or substituted aryl. Other suitable bases include the salts formed by the addition of $CS_2$ or COS to bases of the Formula I. As used herein in relation to defining these bases, "aryl" represents a hydrocarbon moiety not containing any unsaturation other than of the benzenoid type.

While any of the above-mentioned metal mercaptides, alkoxides, and aryloxides may be advantageously employed in the practice of this invention, preferred bases comprise those compounds wherein the metal component is an alkali metal (lithium, sodium, potassium, rubidium, cesium) and especially sodium or potassium; an alkaline earth metal (calcium, strontium, barium) or aluminum.

It is further to be clearly understood that the terms "mercaptides," "alkoxides," and "aryloxides" as used herein represent compounds of the type I where the alkyl and aryl substituents therein can bear substituents such as halogen, alkyl, aryl, alkoxy, aryloxy, thioalkyl, and the like, since these substituents on the alkyl or aryl groups do not detract from the efficacy of the base in the formation of the desired isothiocyanates. Preferred mercaptides, alkoxides, and aryloxides included in the Formula I are those wherein R represents alkyl having 1–8 carbon atoms and aryl having 6–10 carbon atoms and these moieties having the above referred to substituents. Particularly preferred embodiments are those bases I wherein R represents lower alkyl (1–4 carbon atoms) phenyl, alkyl- and chloro-substituted phenyl. Illustrative of such suitable bases are the selected metal methoxides, ethoxides, isopropoxides, tert-butoxides, phenoxides, alkylphenoxides, chlorophenoxides, methylmercaptides, ethylmercaptides, butylmercaptides, phenylmercaptides, and tolylmercaptides.

Alkali metal and alkaline earth metal hydroxides as well as salts formed by the reaction of such strong bases with weak acids (e.g., $K_2CO_3$) have been used as the required bases in the anhydrous process described herein, but lesser yields of the desired aromatic isothiocyanates have been obtained, and the use of these basic materials is not preferred in this process.

While both carbon disulfide and carbonyl sulfide may be employed in the preparation of the aromatic isothiocyanates, there are some differences involved in their use. Thus, for instance, the use of carbonyl sulfide under selected conditions does appear to provide higher conversions of the aromatic nitro compounds as well as higher yields of aromatic isothiocyanates than the use of a similar molar quantity of carbon disulfide under similar conditions.

Furthermore, when carbonyl sulfide is used as a reactant, only the mercaptides of the Formula I (X=sulfur) are useful in the process, since the alkoxides and aryloxides do not appear to be effective in promoting aromatic isothiocyanate formation when carbonyl sulfide is utilized as a reactant. In this area, it has also been found that useful bases to be utilized in conjunction with carbonyl sulfide are those metallic dithiocarbonates formed by the reaction of carbonyl sulfide with the mercaptides included in the Formula I. Thus, when carbonyl sulfide is employed as a reactant, it has been determined that the mercaptides of Formula I and metallic dithiocarbonates (formed by reaction of COS with the mercaptides) are the suitable required bases wherein the desired aromatic isothiocyanates are best provided. These basic materials must be employed in an amount of at least 0.01 mole/mole of nitro group in the aromatic nitro compound, and preferably in an amount of at least 0.1 mole/mole of nitro group in the aromatic nitro reactant. Thus, for instance, for each mole of aromatic mononitro compound reactant utilized, the basic material should be used in an amount of at least 0.01 mole and preferably in an amount of at least 0.1 mole. When polynitro reactants are utilized, naturally more basic material must be employed (e.g., when dinitrobenzene is used at least 0.02 mole and preferably at least 0.2 mole of these basic materials per mole of reactant).

However, when carbon disulfide is utilized as a reactant in preparing organic isothiocyanates in accordance with this invention, the mercaptides, alkoxides and aryloxides of the Formula I may all be utilized in the process as well as the metallic dithiocarbonates and trithiocarbonates formed by the known reaction of $CS_2$ with the bases I. Thus, when carbon disulfide is utilized as a reactant, it has been determined that the mercaptides, alkoxides and aryloxides of the Formula I and the addition salts of the bases I with $CS_2$ (metallic dithiocarbonates and trithiocarbonates) are the suitable required bases in the preparation of aromatic isothiocyanates. These basic materials must be employed in an amount of at least 0.2 mole/mole of nitro group in the aromatic nitro compound, and preferably in an amount of at least 0.5 mole/mole of nitro group in the aromatic nitro reactant. Thus, for instance, for each mole of aromatic mononitro compound reactant utilized, the basic material should be used in an amount of at least 0.2 mole and preferably in an amount of at least 0.5 mole. When polynitro reactants, are utilized, naturally more basic material must be employed (e.g., when dinitrobenzene is used at least 0.4 mole and preferably at least 1.0 mole of these basic materials per mole of reactant). The mercaptides included in the Formula I are the preferred basic materials when carbon disulfide is employed, since the use of mercaptides involves the formation of lesser amounts of undesirable aromatic primary amine by-products than is obtained when alkoxides or aryloxides are used.

Since the process of this invention is performed at an elevated temperature range of about 125°–250° C., the reaction should be carried out in a closed reaction vessel. The reaction requires no additional pressure, since it proceeds easily under autogeneous pressure; but, if desired, the reaction may be run at increased pressure, e.g., by charging inert gases such as nitrogen. It has been found that a preferred temperature range of about 150°–200° C. is used for best results.

While solvents are not necessary in the practice of this invention, they can also be used. For instance, excess carbon disulfide or excess aromatic nitro compound may be used as solvents if so desired. Other solvents which are chemically inert to the components of the reaction system may also be conveniently employed. Among such suitable solvents are aliphatic and aromatic hydrocarbons such as benzene and toluene, halogenated aliphatic and aromatic hydrocarbons such as carbon tetrachloride, monochloronaphthalene, monochlorobenzene, dichlorobenzene, and the like. The proportion of solvents which may be conveniently employed is not critical, and any proportions may be employed which will not require excessively large equipment to contain.

The required sealed reaction vessel may be an autoclave or any other type of pressure reactor, and preferably such vessel should be equipped with stirring or rocking means. Workup of the reaction product provided by the process of this invention is uncomplicated. Thus, upon completion of the desired reaction at the above-mentioned elevated temperature range, the reaction vessel is generally cooled to ambient temperature prior to venting and removal of the crude reaction product. Filtration, or other suitable solid-liquid separation techniques may be employed to remove solids or residues from the reaction product, and fractional distillation is preferably employed to isolate the organic isothiocyanates from the reaction product. However, other suitable separation techniques such as extraction, sublimation, freezing, etc., may be advantageously employed in the isolation of isothiocyanate products. All of the above-illustrated separation techniques may be carried out continuously.

The following examples are presented to further illustrate the process of this invention without any intention of being limited thereby.

EXAMPLE 1

Under a nitrogen blanket, a 300 ml. rocking autoclave was charged with 25 g. (0.23 mole) of nitrobenzene, 50 g. (0.66 mole) of carbon disulfide, and 6.0 g. (0.11 mole) of sodium methoxide. The mixture of the reactants was heated to 160°–165° C.; this was accompanied by a pressure build-up of 200 p.s.i.g. The reaction mixture was kept at the said temperature for three hours. After cooling, the reaction mixture was filtered, carbon disulfide was evaporated from the filtrate, and the residue was distilled in vacuo to render 32.5 g. of a liquid reaction mixture containing 7.5 g. of phenylisothiocyanate which corresponds to a corrected yield of 66.5%.

EXAMPLES 2–14

Amounts of 0.1 mole of the organic nitro compounds listed in Table I, 50 g. of carbon disulfide, and 2.7 g. of sodium methoxide were heated in a 100 ml. rocking autoclave for four hours at 175° C. After cooling to room temperature and venting the gases, the reaction mixture was filtered and the filtrate was distilled in vacuo. The distillate was quantitatively analyzed by vapor phase chromatography. The yields of isothiocyanate obtained are summarized in Table I.

EXAMPLE 15

Under conditions similar to those described in Examples 2–14 was reacted 0.1 mole (15.3 g.) of o-nitroanisole with 50 g. of carbon disulfide and 5.8 g. of sodium phenoxide. This reaction afforded o-methoxyphenylisothiocyanate in a 65% yield.

EXAMPLE 16

25 g. of nitrobenzene (0.2 mole), 75 g. of carbon disulfide, and 7.0 g. of sodium methylmercaptide were charged to a rocking autoclave; then the mixture was heated for four hours at 175° C. The crude reaction mixture was worked up as outlined in the preceding examples. Phenylisothiocyanate was obtained in a 58.1% yield.

EXAMPLES 17–34

Amounts of 0.2 mole of the organic nitro compounds listed in Table II, 125 ml. of carbon disulfide, and 0.1 mole of the bases listed in Table II were heated at 160° C. for three hours in a stirring autoclave. Thereafter workup procedure was to wash thoroughly the crude reaction mixture with cold water and to separate the layers. The organic layer was distilled to afford isothiocyanate, some unreacted nitro compound and the organic disulfide. The results are listed in Table II.

EXAMPLE 35

Amounts of 10.9 g. (0.1 mole) of nitrosobenzene, 25 g. of carbon disulfide, 2.0 g. of sodium methoxide, and 40 ml. of chlorobenzene were mixed and heated in a rocking autoclave for 3.5 hours at 167° C. The reaction mixture was filtered and distilled in vacuo to render 3.5 g. of phenylisothiocyanate which corresponds to a 70% yield.

TABLE I

| Starting material | Reaction product | Corrected yield, percent |
| --- | --- | --- |
| o-Nitrotoluene | o-Tolylisothiocyanate | 39.2 |
| m-Nitrotoluene | m-Tolylisothiocyanate | 66.5 |
| p-Nitrotoluene | p-Tolylisothiocyanate | 44.5 |
| o-Nitroanisole | o-Methoxyphenylisothiocyanate | 44 |
| m-Nitroanisole | m-Methoxyphenylisothiocyanate | 81 |
| o-Chloronitrobenzene | o-Chlorophenylisothiocyanate | 11 |
| m-Chloronitrobenzene | m-Chlorophenylisothiocyanate | 64 |
| 2,5-dimethylnitrobenzene | 2,5-dimethylphenylisothiocyanate | 8 |
| m-Nitrobenzonitrile | m-Isothiocyanatobenzonitrile | 50 |
| 1-nitronaphthalene | 1-naphthylisothiocyanate | 50 |
| 2-nitrobiphenyl | 2-biphenylisothiocyanate | 75 |
| 4-nitrodiphenylether | 4-isothiocyanatodiphenylether | 28 |
| Bis(p-nitrophenyl)sulfide | 4-nitrophenyl-4'-isothiocyanatophenyl sulfide | 61 |

EXAMPLES 36–40

A 300 ml. stirring or rocking autoclave is charged with 0.2 mole of the aromatic nitro compound and 0.1 mole of the base. The vessel is sealed and connected to a Hoke cylinder containing the desired amount (60–120 g.) of carbonyl sulfide which is transferred to the pre-cooled reactor (−70 to −80° C.). The reaction mixture is heated at 160° for three hours. The crude reaction mixture is distributed between 250 ml. of ether and 200 ml. of cold water. The ether layer is dried and distilled to give the isothiocyanate. Yields are recorded in Table III.

TABLE II

| Starting material | Base | Reaction product | Corrected yield, percent |
|---|---|---|---|
| o-Nitrotoluene | Sodium m-tolymercaptide | o-Tolylisothiocyanate | 52 |
| m-Nitrotoluene | do | m-Tolylisothiocyanate | 78 |
| Do | Sodium phenylmercaptide | do | 58 |
| p-Nitrotoluene | Sodium m-tolylmercaptide | p-Tolylisothiocyanate | 98 |
| o-Nitroanisole | do | o-Methoxyphenylisothiocyanate | 88 |
| m-Chloronitrobenzene | do | m-Chlorophenylisothiocyanate | 84 |
| Nitrobenzene | do | Phenylisothiocyanate | 73 |
| Do | Sodium phenymercaptide | do | 70 |
| Do | Potassium m-tolylmercaptide | do | 47 |
| Do | Lithium m-tolylmercaptide | do | 35 |
| Do | Sodium tert-butylmercaptide | do | 46 |
| Do | Sodium triphenylmethylmercaptide | do | 37 |
| Do | Disodium 2,2'-thiodiethanethiolate | do | 51 |
| Do | Sodium p-tolylmercaptide | do | 80 |
| Do | Sodium o-tolylmercaptide | do | 53 |
| Do | Sodium p-tert-butylphenylmercaptide | do | 60 |
| Do | Sodium 2-naphthylmercaptide | do | 42 |
| Do | Sodium m-tolyltrithiocarbonate | do | 77 |

TABLE III

| Starting material | Base | Reaction product | Corrected yield, percent |
|---|---|---|---|
| Nitrobenzene | Sodium m-tolylmercaptide | Phenylisothiocyanate | 22 |
| Do | Sodium phenylmercaptide | do | 41 |
| m-Nitrotoluene | do | m-tolylisothiocyanate | 55 |
| Do | Sodium m-tolylmercaptide | do | 52 |
| p-Nitroanisole | Sodium phenylmercaptide | p-methoxyphenylisothiocyanate | 53 |

What is claimed is:

1. A process for providing an aromatic isothiocyanate which comprises
   (a) reacting a carbocyclic aromatic nitro compound having up to thirteen carbon atoms with carbon disulfide in a closed reaction system at a temperature range of about 125°–250° C. in the presence of
   (b) a material selected from the group consisting of a base of the formula $$Me(XR)_n$$

wherein Me represents an alkali metal, calcium, strontium, barium or aluminum; X represents oxygen or sulfur; $n$ is an integer from 1–3; and R represents alkyl having 1–8 carbon atoms, triphenylmethyl, aryl having 6–10 carbon atoms, or chlorophenyl; or a dithiocarbonate or trithiocarbonate formed by reaction of carbon disulfide with a base of said formula;
   (c) said material being employed in an amount of at least 0.2 mole/mole of nitro groups in said aromatic nitro compound, and
   (d) recovering said aromatic isothiocyanate from the reaction mixture.

2. The process of claim 1 wherein a temperature range of about 150°–200° is employed.

3. The process of claim 1 wherein said material is employed in an amount of at least 0.5 mole/mole of nitro groups in said aromatic nitro compound.

4. The process of claim 1 wherein an alkali metal aryl mercaptide is employed as the base.

5. The process of claim 4 wherein an alkali metal phenyl mercaptide is employed as the base.

6. The process of claim 4 wherein an alkali metal tolyl mercaptide is employed as the base.

7. The process of claim 1 wherein an alkali metal alkyl mercaptide is employed as the base.

8. The process of claim 1 wherein said aromatic nitro compound is selected from the group consisting of nitrobenzenes, alkylnitrobenzenes, alkoxynitrobenzenes, and the nitrated mono-, di-, and trichlorobenzenes and toluenes.

9. The process of claim 1 wherein an alkali metal alkoxide is employed as the base.

10. A process for providing an aromatic isothiocyanate which comprises
    (a) reacting a carbocyclic aromatic nitro compound having up to thirteen carbon atoms with carbonyl sulfide in a closed reaction system at a temperature range of about 125°–250° C. in the presence of
    (b) a material selected from the group consisting of a base of the formula $$Me(SR)_n$$

wherein Me represents an alkali metal, calcium, strontium, barium or aluminum; $n$ is an integer from 1–3; and R represents alkyl having 1–8 carbon atoms, triphenylmethyl, aryl having 6–10 carbon atoms, or chlorophenyl; or a dithiocarbonate formed by reaction of carbonyl sulfide with a base of said formula;
    (c) said material being employed in an amount of at least 0.01 mole/mole of nitro groups in said aromatic nitro compound, and
    (d) recovering said aromatic isothiocyanate from the reaction mixture.

11. The process of claim 10 wherein a temperature range of about 150°–200° C. is employed.

12. The process of claim 10 wherein said material is employed in an amount of at least 0.1 mole/mole of nitro groups in said aromatic nitro compound.

13. The process of claim 10 wherein an alkali metal alkyl mercaptide is employed as the base.

14. The process of claim 10 wherein an alkali metal aryl mercaptide is employed as the base.

15. The process of claim 14 wherein an alkali metal phenyl mercaptide or an alkali metal tolyl mercaptide is employed.

16. The process of claim 10 wherein said aromatic nitro compound is selected from the group consisting of nitrobenzenes, alkylnitrobenzenes, alkoxynitrobenzenes, and the nitrated mono-, di-, and trichlorobenzenes and toluenes.

References Cited

UNITED STATES PATENTS 1,689,014  10/1928  Dieterle _____ 260—689 XR
2,263,386  11/1941  Hester _____ 260—454

LEWIS GOTTS, Primary Examiner

G. HOLLRAH, Assistant Examiner

U.S. Cl. X.R.

71—104; 424—302